United States Patent [19]
Klein et al.

[11] Patent Number: 4,931,183
[45] Date of Patent: Jun. 5, 1990

[54] PROCESS AND APPARATUS FOR THE BIOLOGICAL PURIFICATION OF WATER

[76] Inventors: Hans-Ulrich Klein, Verdistrasse 2, 6200 Wiesbaden; Klaus Kratzenstein, Köttchen 9, 5830 Schwelm, both of Fed. Rep. of Germany

[21] Appl. No.: 210,815

[22] Filed: Jun. 24, 1988

[51] Int. Cl.$^5$ .............................................. C02F 3/04
[52] U.S. Cl. .................................... 210/614; 210/617; 210/618; 210/804; 210/104; 210/120; 210/138; 210/151; 210/265; 210/311; 210/313
[58] Field of Search .............. 210/614, 617, 104, 151, 210/311, 120, 137, 138, 265, 302, 313, 618, 804, 807

[56] References Cited

U.S. PATENT DOCUMENTS

| | | | |
|---|---|---|---|
| 1,274,227 | 7/1918 | Woodson et al. | 210/311 |
| 1,362,125 | 12/1920 | Maple | 210/311 |
| 2,200,581 | 5/1940 | Pruss et al. | 210/617 |
| 3,342,727 | 9/1967 | Ozringle | 210/614 |
| 3,649,532 | 3/1972 | McLean | 210/151 |
| 3,755,157 | 8/1973 | Wisfeld et al. | 210/618 |
| 4,192,742 | 3/1980 | Bernard et al. | 210/614 |
| 4,237,003 | 12/1980 | El-Sayed | 210/617 |
| 4,274,966 | 6/1981 | Palmer | 210/618 |
| 4,322,296 | 3/1982 | Fan et al. | 210/618 |
| 4,336,135 | 6/1982 | Price | 210/151 |
| 4,599,174 | 7/1986 | McDowell | 210/614 |
| 4,620,929 | 11/1986 | Hofmann | 210/617 |
| 4,696,747 | 9/1987 | Verstraete et al. | 210/617 |

FOREIGN PATENT DOCUMENTS

| | | |
|---|---|---|
| 2329279 | 1/1975 | Fed. Rep. of Germany . |
| 3545672 | 6/1987 | Fed. Rep. of Germany . |
| 61-271090 | 5/1985 | Japan . |

*Primary Examiner*—Peter Hruskoci
*Assistant Examiner*—Christopher Upton
*Attorney, Agent, or Firm*—Gifford, Groh, Sprinkle, Patmore and Anderson

[57] ABSTRACT

In a process and apparatus for the biological purification of water by means of a closed percolating filter operated with pure oxygen and/or air, and an upward-flow filter disposed downstream of the percolating filter, with flotation filter material therein, saturation of the gas cushion predominantly containing oxygen in the percolating filter is controlled by selection of the operating pressure in such a fashion that the oxygen supply corresponds to the biochemical oxygen demand of the water on the one hand, while on the other hand a residual oxygen content dissolved in the water permits continuation with a biological fine purification operation in the upward-flow filter. The apparatus comprises a first chamber with the percolating filter, the water flowing downwardly therethrough, and a second chamber with filter material through which the water flows upwardly. Water accumulating above the filter material is removed through a discharge conduit, with the waste water and oxygen-bearing gas being introduced into the top of the first chamber.

20 Claims, 2 Drawing Sheets

PROCESS AND APPARATUS FOR THE BIOLOGICAL PURIFICATION OF WATER

BACKGROUND OF THE INVENTION

A procedure for the purification of communal and/or industrial waste water involves firstly passing the water into a collecting tank or vessel in which the water is subjected to preliminary settlement or clarification, followed then by a conventional biological purifying stage. A biological purifying stage of that kind comprises for example an activated sludge installation to which air or oxygen is fed. In accordance with the partial pressure in the air, the water becomes enriched with oxygen and, in the course of time, micro-organisms establish themselves at the interface formed by the solid substances with water and air. Those micro-organisms interact with substances which are dissolved and also dispersed in the waste water. After the biological purification stage, the water is then passed into a post-settlement or post-clarification vessel with a sludge remover.

It will be apparent from the foregoing that conventional installations for the purification of waste waters involve a high level of apparatus expenditure and take up a great deal of space, while operation thereof, and the maintenance that they involve, gives rise to a not inconsiderable level of expenditure, including from the point of view of personnel.

Not least an improvement in the level of efficiency of such installations requires a feed of pure oxygen, which still further increases the costs involved while in addition the oxygen which is employed in that situation is often only utilised to an inadequate degree.

SUMMARY OF THE INVENTION

An object of the present invention is to provide a process for the biological purification of water, which is such that it permits a substantial reduction in the level of apparatus expenditure in comparison with previous processes.

Another object of the present invention is to provide a process for the biological purification of water which ensures optimum utilisation of the oxygen used in the process.

Still another object of the present invention is to provide a process for the biological purification of water such as waste water which has been subjected to a preliminary settling operation, which involves a reduced level of water losses and oxygen losses, with fully automatic regulation of the consumption of oxygen.

A still further object of the present invention is to provide a process for biological purification of water, which is of a compact construction and readily transportable and which can be extended by a modular system.

Yet a further object of the present invention is to provide apparatus for the biological purification of water, which is capable of operating with a high level of efficiency in a fully automatic manner involving restricted monitoring and maintenance thereof.

In accordance with the present invention, these and other objects are achieved by a process for the biological purification of water, such as waste water which has been subjected to a preliminary settling operation, wherein the water to be treated is brought into contact with oxygen-bearing gas such as pure oxygen and/or air, in a condition of intense agitation, to form a biological layer, with the formation of a cushion of gas under pressure. The supply of oxygen is controlled on the one hand in accordance with the biochemical oxygen requirement of the water and on the other hand to continue with a biological fine purification operation, in that by suitable selection of the operating pressure in the gas cushion, the oxygen which is genuinely dissolved in the water is fully maintained, in spite of the biochemical requirement, so as to ensure a sufficient stock of oxygen which is genuinely dissolved in the water, for the biological fine cleaning operation in a subsequent filter stage.

The invention also provides an apparatus for the biological purification of water, comprising a first pressure chamber accommodating a percolating filter through which the water to be treated flows or trickles downwardly. Operatively associated with the first pressure chamber is a second pressure chamber accommodating a filter comprising a filter material of a specific weight of <1 and defined at the top side thereof by a nozzle plate member. The water to be treated flows upwardly through the filter in the second pressure chamber. A communication is provided between the undersides of the first pressure chamber which accommodates the percolating filter and the second pressure chamber which accommodates the upward filter material, while provided on the first pressure chamber is a waste water feed conduit which opens thereinto at the top, and a gas feed conduit. A clean water removal conduit is disposed on the second pressure chamber, above the upper nozzle plate member thereof.

In an advantageous further feature of the invention, the feed conduit for air or $O_2$ opens into the apparatus at the top side of the first pressure chamber accommodating the percolating filter. The second pressure chamber in which the water is subjected to filtration in an upward direction disposed in the form of an annular chamber concentrically around the first pressure chamber. In that arrangement, communicating openings are advantageously provided in the lower region in the wall construction between the first and second pressure chambers. Furthermore, at its underside the first pressure chamber is of a taperingly convergent configuration and is provided at the lower end portion thereof with a sludge discharge opening with a sludge discharge valve. Advantageously, to provide for good distribution of the waste water over the entire cross-section of the first pressure chamber and the percolating filter accommodated therein, provided at the outflow opening of the waste water feed conduit at the top side of the first pressure chamber is a sprinkle, nozzle assembly for thus distributing the water over the percolating filter.

Another advantageous embodiment of the invention provides that the first and second pressure chambers comprise first and second columns which are disposed in side-by-side relationship and which at the bottom thereof are communicated with a communicating conduit. In that arrangement, in an advantageous embodiment thereof, the first pressure chamber may be disposed at a central position with a plurality of columns providing said second pressure chambers being disposed therearound. Another advantageous embodiment provides that associated with the columns forming the second pressure chambers and accommodating upward-flow filters is a pressure vessel which is communicated with those columns by way of a conduit at the top side of the pressure vessel. A sludge discharge opening is advantageously provided substantially centrally of the tapering bottom of the filter columns.

In accordance with yet another preferred embodiment of the invention a gas discharge valve is disposed at the top side of the first pressure chamber, and a timing circuit is provided for controlling the valve, for opening same, when the waste water feed and oxygen feed valves are closed. The apparatus further advantageously includes a timing means for opening a sludge discharge valve at the underside of the first pressure chamber, at intervals of time.

Advantageously, the apparatus may include a pressure circuit for opening the gas discharge valve, while a pressure holding regulating valve may be provided on the clean water discharge conduit, that valve responding in accordance with continuous measurement of the residual oxygen in the clean water. Another advantageous embodiment of the invention provides that a fan is operable in dependence on the level of water in the first pressure chamber for automatically regulating the feed of gas such as oxygen to the installation.

In a preferred feature of the invention, disposed upstream of the apparatus is a collecting and pre-settlement tank or container, in the form of a high-level container, and the static upstream pressure produced thereby corresponds to the system pressure of the apparatus according to the invention.

Further objects, features and advantages of the present invention will be apparent from the following description of a preferred embodiment thereof.

BRIEF DESCRIPTION OF THE DRAWING

The accompanying FIG. 1 of the drawing illustrates partly in section an embodiment of the apparatus according to the invention, for carrying out the process of the invention.

DESCRIPTION OF THE PREFERRED EMBODIMENT

Figure 1:
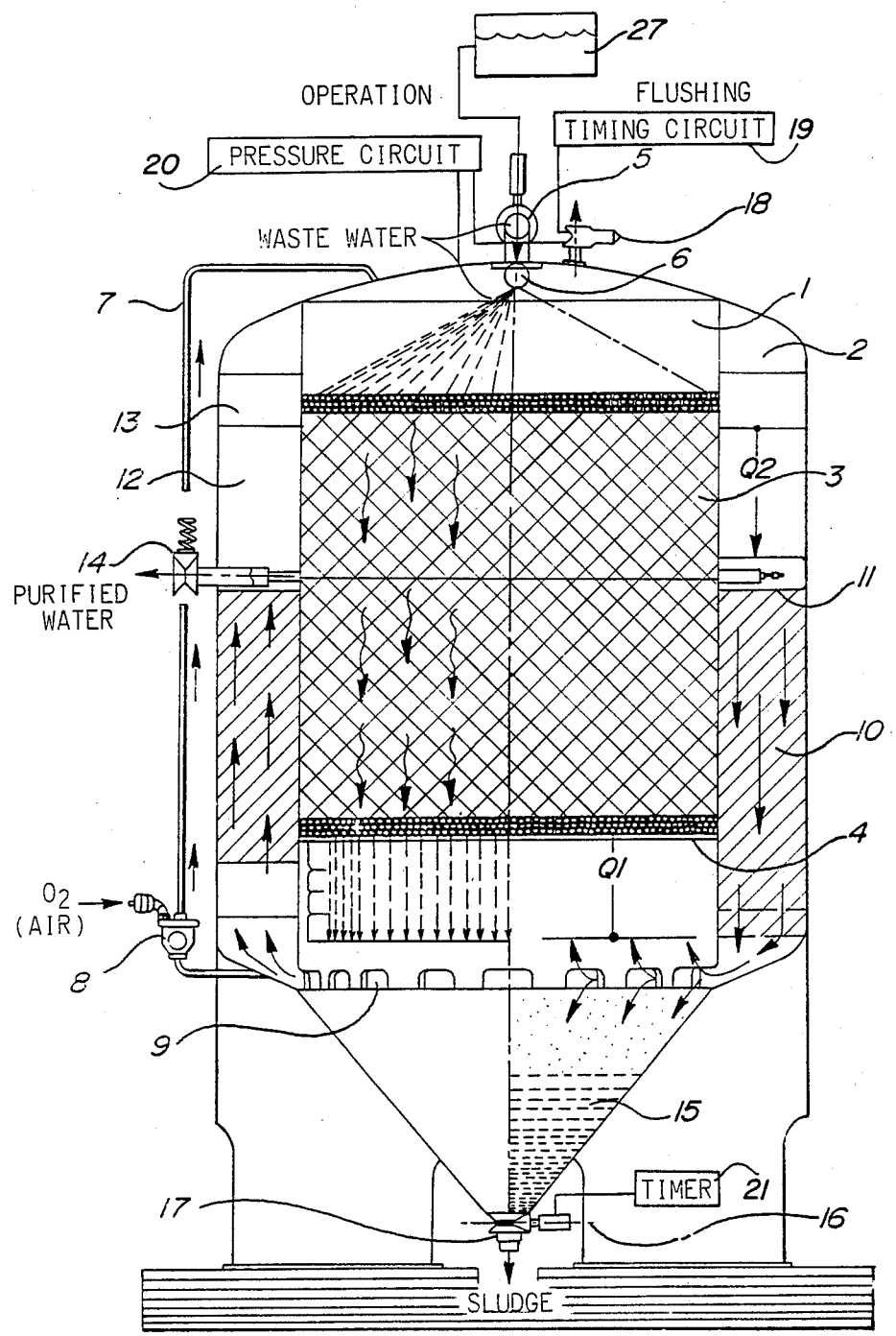

Referring to the drawing, the illustrated apparatus for the biological purification of water such as waste water which has been subjected to a preliminary settling or clarifying operation in an upstream collecting and pre-settlement tank 27 comprises a generally centrally disposed first pressure chamber 1, and an annular second pressure chamber which is disposed substantially concentrically therearound. The first pressure chamber 1 has a filling as indicated at 3, forming a percolating filter through which the water to be treated is passed in a downward direction. The filling 3 comprises crushed and graded lava of a grain size of about 20 mm, and rests on a perforated support plate 4.

Reference numeral 5 in the drawing denotes a waste water feed conduit connected at its outflow opening to a sprinkler nozzle 6 in the form of a full-cone nozzle, through which the waste water, which has been subjected to the pre-settlement or pre-clarification operation, is sprinkled on to the percolating filter filling 3 substantially uniformly over the entire cross-section of the first pressure chamber 1. In the drawing, the left-hand half thereof shows the operating condition of the apparatus while the right-hand half illustrates a rinsing or flushing operation which will be described hereinafter.

Besides the waste water which is sprinkled on to the percolating filter filling 3, oxygen passes into the upper part of the first pressure chamber 1 through an oxygen feed conduit 7 and forms a cushion of gas which extends downwardly until the level of water under the perforated plate member harmonises with the float valve for controlling a fan 8.

Over the entire surface of the filling 3, consisting of the porous granular lava material, the micro-organisms which are produced by the biological reaction of the oxygen with the organic substances in the waste water form a bacteria flora, which may be referred to as the biological cover. The water flows with a trickle flow through the filling 3 in the first pressure chamber 1 and at the bottom flows through openings 9 into the lower region of the second filter chamber 2. It then flows upwardly through the upward filter as indicated at 10 in the second pressure chamber 2, and accumulates in the form of clean and purified water, as indicated at 12 in the drawing, above the nozzle plate portion 11 which delimits the filter 10 in an upward direction. A cushion of air as indicated at 13 is formed above the surface of the purified water 12, and the purified water 12 can be removed from the apparatus by way of a clean water removal valve 14.

The gas pressure in the first pressure chamber 1 consists of the sum of the air cushion pressure above the surface of the clean water above the upward filter 10 and the difference in level between the level of the water in the first pressure chamber 1 and that of the clean water plus the filter resistance and in the above-described apparatus is for example 2.0 bars. The clean water removal valve 14 is in the form of a pressure holding valve and it regulates the discharge flow of clean water insofar as no post-treatment installation for the production of drinking water and water fit for industrial use utilises that upstream pressure.

With an oxygen gas pressure of 2.0 bars and a temperature of 15° C., 145 mg/l of oxygen is genuinely typically dissolved in the water. That high level of oxygen supply accelerates biological decomposition and provides that the water which is under pressure, downstream of the percolating filter stage 3, transports a stock or deposit of oxygen into the upward filter 10 in the second pressure chamber 2. The net oxygen consumption in the first pressure chamber 1 and the percolating filter material 3 contained therein approximately corresponds to the biochemical oxygen demand of the waste water. That amount of oxygen is fully automatically supplied to the first pressure chamber 1 and the percolating filter material 3 by way of the fan 8 from the evaporator of a liquid oxygen installation.

The inactive constituents of the biological cover are entrained by the water which is trickling down through the percolating filter and undergo sedimentation in a sludge thickener as indicated at 15, formed by the lower part of the taperingly convergent configuration at the underside of the first pressure chamber 1, or are retained in the filter 10. A biological fine purification operation takes place in the filter 10, with a film-like cover being formed on the fine-pore foam granulate material of the filter 10. That film-like cover lives off the oxygen excess of the water to be filtered therein.

As indicated above, the sludge thickener 15 tapers downwardly to a tip at which is a sludge removal opening with a sludge removal valve 16 to which a sludge removal conduit 17 is connected.

The installation includes a number of other devices to provide for fully automatic operation of the apparatus. Thus, provided at the top side of the first pressure chamber 1 is a gas discharge valve 18 which is operatively associated with a pressure circuit 20 for opening the valve 18. The valve 18 as well as the fan 8 and the sludge discharge valve 16 are provided with electrical actuating means. For example, the gas discharge valve 18 is additionally or alternatively actuated by a timing circuit 19, while the sludge discharge valve 16 is actuated by a timing circuit or timer 21. The pressure holding regulating valve 14 on the clean water discharge conduit responds to continuous measurement of the residual oxygen in the clean water 12. In that way, besides regular operation of the apparatus, it is also possible to carry out a flushing or rinsing operation which is shown on the right-hand side of the drawing. In operation of the apparatus, the filter becomes increasingly clogged with matter so that the filter resistance rises and increases the pressure of the gas cushion in the first pressure chamber 1. As a result, a flushing or rinsing operation is initiated by means of pressure actuation and/or time control, as follows: the control valve on the water feed conduit 5 which also has an electrical actuating means, and the oxygen feed valve at the fan 8 are closed while the clean water pressure holding valve 14 also remains in a closed condition. The upper gas discharge valve 18 is opened, a fixed gas consisting of oxygen, carbon dioxide, nitrogen and other gaseous reaction products then issuing therefrom. At the same time the air cushion 13 above the falling level of clean water 12 expands so that the filter 10 is flushed out in a surge-like mode and the water level in the first pressure chamber 1 rises by the amount indicated at Q1 in the right-hand side of the illustration in the drawing, while the level of the clean water 12 falls by the amount Q2. The sludge removed accumulates in the sludge thickener 15. After a period of about 60 to 90 seconds, the valve 18 is closed by the timing circuit 19 and the waste water feed valve on the conduit 5 and the oxygen feed valve at the fan 8 are opened. The gas cushions in the first pressure chamber 1 and in the second pressure chamber 2 are compressed and the apparatus operates in the above-described manner, as shown in the left-hand side of the drawing. The sludge is removed from the lower part of the apparatus under the control of the timer 21, having regard to the thickening time required therefor, by the sludge discharge valve 16 being suitably opened.

Figure 2:
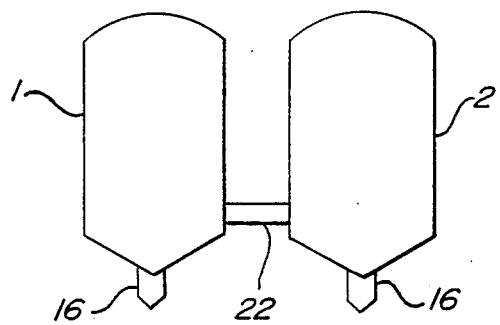
FIG. 2 is a side view of another preferred embodiment of the present invention.
Figure 3:
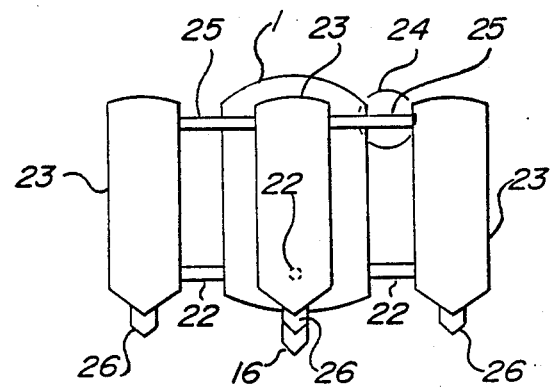
FIG. 3 is a side view of another preferred embodiment of the present invention.
Figure 4:
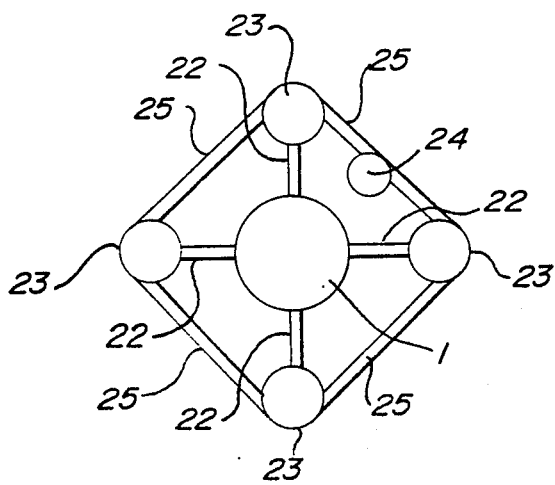
FIG. 4 is a top view of the embodiment shown in FIG. 3.

Besides the structural configuration illustrated it is also possible for the first pressure chamber 1 and the second pressure chamber 2 to comprise (FIG. 2) first and second columns which are arranged in side-by-side relationship and which are communicated at the bottom sides thereof with a communicating conduit 22. It is also possible for the apparatus to have a centrally disposed first pressure chamber 1 accommodating the percolating filter, and a plurality of columns 23 in which the water is filtered therethrough in the upward direction, forming the second pressure chamber 2, with the columns being disposed substantially concentrically around the first pressure chamber 1 with the percolating filter therein (FIGS. 3 and 4). In that arrangement there may be associated with the upward filter columns a separate pressure vessel 24 which is communicated with the columns by way of a circuit 25 at the top side of the pressure vessel. The upward filter columns have a sludge removal opening 26 in the middle of their tapering bottom portion. In other respects, the mode of operation of that arrangement which involves the separate provision of the first pressure chamber with the percolating filter and the second pressure chamber with upward filter columns is the same as that described above.

It will be appreciated therefore that the invention provides an apparatus which replaces a biological purification stage and the post-settlement tank of conventional waste water purification installations, and which makes it possible for the apparatus to be of a compact construction which can be transported without difficulty and which can be expanded as desired by means of a modular configuration. Water losses occur only insofar as the sludge to be removed from the apparatus contains water, while oxygen losses occur only in the flushing operation for simultaneously removing gases which are not desired in the apparatus.

The consumption of oxygen is regulated fully automatically and the upward filter 10 in the second pressure chamber 2 not only performs the function of a post-settlement tank but also permits biological fine purification, utilising the excess oxygen dissolved in the water.

By simply connecting a further treatment stage to the apparatus on the downstream side thereof, and by means of a disinfection stage, it is possible to produce water of drinking and industrial-use quality. In that connection the process of the invention and the entire operation of the apparatus is extremely acceptable from an environmental point of view.

As operation of the apparatus is controlled in a fully automatic fashion by pressure and timing circuits, operation thereof is restricted to checking and monitoring the indicator instruments while maintenance is restricted to operation of the valves.

It will be appreciated that the above-described process and apparatus according to the present invention have been described solely by way of example and illustration thereof and that various other modifications and alterations may be made therein without thereby departing from the spirit and scope of the invention.

I claim:

1. Apparatus for the biological purification of water comprising: a first chamber containing a percolating filter means therein, through which the water to be treated passes downwardly; a second chamber containing a filter means comprising a filter material having a specific gravity of <1 and an upper nozzle plate at the top thereof, wherein the water to be treated flows through said filter material upwardly; means providing fluid communication between the bottoms of the first and second chambers; a waste water feed conduit opening into the first chamber at the top thereof; an oxygen-containing gas feed conduit opening into the first chamber; and a clean water removal conduit in fluid communication with the second chamber above said nozzle plate.

2. Apparatus as set forth in claim 1 wherein the gas feed conduit opens into the first chamber at the top thereof.

3. Apparatus as set forth in claim 1 wherein said second chamber is in the form of an annular chamber disposed concentrically around the first chamber.

4. Apparatus as set forth in claim 1 wherein said communicating means are openings in the lower region of wall means between the first and second chambers.

5. Apparatus as set forth in claim 1 wherein at its underside the first chamber is of a downwardly taperingly convergent configuration and is provided at the bottom thereof with a sludge discharge opening with a sludge discharge valve.

6. Apparatus as set forth in claim 1 including a sprinkler nozzle connected to the outflow opening of said waste water feed conduit, for distributing the waste water at least substantially over the entire cross-section of the first chamber.

7. Apparatus as set forth in claim 1 wherein the first and second chambers comprise first and second columns disposed in side-by-side relationship, and including communicating conduit means communicating said first and second columns at the bottoms thereof.

8. Apparatus as set forth in claim 1 wherein said second chamber comprises a plurality of columns disposed around a centrally arranged first chamber.

9. Apparatus as set forth in claim 8 including a pressure vessel and conduit means at the top of said pressure vessel communicating said pressure vessel with said columns.

10. Apparatus as set forth in claim 8 comprising a sludge discharge opening disposed substantially at the centre of the bottom of said columns.

11. Apparatus as set forth in claim 10 wherein said bottom is of a tapering configuration.

12. Apparatus as set forth in claim 1 wherein said water and gas feeds are closeable, further comprising a gas discharge valve disposed at the top of the first chamber, and a timing circuit for controlling said valve to open said valve when said water and gas feeds are closed.

13. Apparatus as set forth in claim 12 and further including a pressure circuit for opening said gas discharge valve.

14. Apparatus as set forth in claim 1 and comprising a sludge discharge valve at the bottom of the first chamber and an electrical timer for periodically opening said valve.

15. Apparatus as set forth in claim 1 and comprising a pressure holding regulating valve means on the clean water discharge conduit responsive to the amount of residual oxygen in the clean water.

16. Apparatus as set forth in claim 1 and further comprising a fan means responsive to the level of water in the first chamber for automatically regulating the gas feed.

17. Apparatus as set forth in claim 1 and further including a collecting and pre-settlement tank disposed upstream thereof constructed and arranged such that the static upstream pressure produced thereby corresponds to the system pressure of the apparatus.

18. Apparatus as set forth in claim 1, wherein said water has an initial biochemical oxygen demand and a residual demand subject to biological fine cleaning, and further including means for producing an oxygen-containing gas cushion in said first chamber at a pressure simultaneously adequate to (a) supply oxygen to said water in said first chamber in a quantity corresponding to said initial biochemical oxygen demand, and (b) maintain a stock of dissolved oxygen in said water in said second chamber sufficient to permit biological fine purification in said second chamber.

19. Apparatus for the biological purification of water comprising: a housing means; a first chamber within said housing means; percolating filter means disposed in the first chamber; waste water feed conduit means for introducing waste water into said first chamber above said percolating filter whereby said water to be treated passes downwardly therethrough; a gas feed conduit means for introducing a flow of oxygen into said first chamber; a second chamber within said housing means and disposed in substantially concentric relationship around said first chamber; a filter material having a specific gravity of $<1$ disposed in said second chamber; communicating means for providing a flow of water from said percolating filter in said first chamber into said second chamber and upwardly through said filter material therein; means above said filter material in said second chamber for accumulating purified water therein; and purified water discharge conduit means for the removal of said purified water from said means for accumulating same above said filter material.

20. A process for the biological purification of waste water having an initial biochemical oxygen demand and a residual demand subject to biological fine cleaning, comprising the steps of passing said waste water through a biologically active percolating filter and subsequently passing said waste water upwardly through a biologically active fine cleaning filtration stage having a specific gravity of $<1$, while supplying oxygen over said percolating filter in a quantity sufficient to maintain a gas cushion over said waste water in said percolating filter simultaneously adequate to (a) supply oxygen to said waste water in said percolating filter in a quantity corresponding to said initial biochemical oxygen demand, and (b) maintain a stock of dissolved oxygen in said waste water in said filtration stage sufficient to permit biological fine purification in said filtration stage.

* * * * *